(12) United States Patent
DeWitt, Jr. et al.

(10) Patent No.: US 8,566,795 B2
(45) Date of Patent: Oct. 22, 2013

(54) SELECTIVELY OBTAINING CALL STACK INFORMATION BASED ON CRITERIA

(75) Inventors: Jimmie Earl DeWitt, Jr., Georgetown, TX (US); Riaz Y. Hussain, Austin, TX (US); Frank Eliot Levine, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1312 days.

(21) Appl. No.: 12/173,053

(22) Filed: Jul. 15, 2008

(65) Prior Publication Data
US 2010/0017789 A1    Jan. 21, 2010

(51) Int. Cl.
*G06F 9/44*    (2006.01)
*G06F 17/18*    (2006.01)
*G06F 11/30*    (2006.01)
*G06F 9/46*    (2006.01)
*G06F 3/00*    (2006.01)

(52) U.S. Cl.
USPC ........... 717/126; 702/179; 702/182; 717/100; 717/128; 717/130; 717/162; 718/100; 718/107; 719/321

(58) Field of Classification Search
None
See application file for complete search history.

(56) References Cited

U.S. PATENT DOCUMENTS

| | | | |
|---|---|---|---|
| 6,055,492 A * | 4/2000 | Alexander et al. | 702/179 |
| 6,158,024 A * | 12/2000 | Mandal | 702/182 |
| 6,338,159 B1 * | 1/2002 | Alexander et al. | 717/128 |
| 6,553,564 B1 | 4/2003 | Alexander, III et al. | |
| 6,651,243 B1 * | 11/2003 | Berry et al. | 717/130 |
| 6,658,652 B1 * | 12/2003 | Alexander et al. | 717/128 |
| 6,751,789 B1 * | 6/2004 | Berry et al. | 717/130 |
| 6,904,594 B1 | 6/2005 | Berry et al. | |
| 6,931,354 B2 | 8/2005 | Jones et al. | |
| 2004/0215768 A1 | 10/2004 | Oulu et al. | |
| 2004/0268316 A1 | 12/2004 | Fisher et al. | |
| 2005/0204349 A1 * | 9/2005 | Lewis et al. | 717/162 |
| 2005/0273757 A1 * | 12/2005 | Anderson | 717/100 |
| 2007/0006168 A1 | 1/2007 | Dimpsey et al. | |
| 2007/0169003 A1 | 7/2007 | Branda et al. | |
| 2007/0220495 A1 * | 9/2007 | Chen et al. | 717/130 |
| 2007/0220515 A1 * | 9/2007 | Dewitt et al. | 718/100 |
| 2008/0148240 A1 * | 6/2008 | Jones et al. | 717/130 |
| 2008/0148241 A1 * | 6/2008 | Jones et al. | 717/130 |
| 2008/0177756 A1 * | 7/2008 | Kosche et al. | 707/100 |
| 2008/0307441 A1 * | 12/2008 | Kuiper et al. | 719/321 |
| 2009/0044198 A1 * | 2/2009 | Kuiper et al. | 718/107 |

OTHER PUBLICATIONS

Susan L. Graham et al., gprof: a call graph execution profiler, Apr. 2004, ACM vol. 39 Issue 4, [Retrieved on May 30, 2013]. Retrieved from the internet: <URL: http://dl.acm.org/citation.cfm?id=989401> 9 Pages (49-57).*

John Whaley., A Portable Sampling-Based Profiler for Java Virtual Machines, ACM 2000, [Retrieved on May 30, 2013]. Retrieved from the internet: <URL: http://dl.acm.org/citation.cfm?id=337483> 10 Pages (78-87).*

* cited by examiner

*Primary Examiner* — Don Wong
*Assistant Examiner* — Anibal Rivera
(74) *Attorney, Agent, or Firm* — Yee & Associates, P.C.; David A. Mims, Jr.

(57) ABSTRACT

A computer implemented method, apparatus, and computer program product for sampling call stack information. A set of methods and a set of criteria are received. Responsive to detecting an event associated with a method in the set of methods, a determination is made as to whether the method has met a set of criteria comprising at least one of a time based metric and a hardware performance monitor counter metric. A call stack is retrieved for the method if the method has met the set of criteria. The retrieved call stack is saved in a tree.

20 Claims, 3 Drawing Sheets

SELECTIVELY OBTAINING CALL STACK INFORMATION BASED ON CRITERIA

BACKGROUND OF THE INVENTION

1. Field of the Invention

The present disclosure relates generally to an improved data processing system and in particular to a method and apparatus for processing data. Still more particularly, the present disclosure relates to a computer implemented method, apparatus, and computer usable program code for call stack sampling at a data processing system.

2. Description of the Related Art

In writing code, runtime analysis of the code is often performed as part of an optimization process. Runtime analysis is used to understand the behavior of components or modules within the code using data collected during the execution of the code. The analysis of the data collected may provide insight to various potential misbehaviors in the code. For example, an understanding of execution paths, code coverage, memory utilization, memory errors and memory leaks in native applications, performance bottlenecks, and threading problems are examples of aspects that may be identified through analyzing the code during execution.

The performance characteristics of code may be identified using a software performance analysis tool. The identification of the different characteristics may be based on a trace facility. A trace tool may use various techniques to provide information, such as execution flows, as well as other aspects of an executing program. A trace may contain data about the execution of code. For example, a trace may contain trace records about events generated during the execution of the code. A trace also may include information, such as a process identifier, a thread identifier, and a program counter. Information in the trace may vary depending on the particular profile or analysis that is to be performed. A record is a unit of information relating to an event that is detected during the execution of the code. In obtaining trace data, it is a common practice to obtain information about executing threads. This information may include call stack information obtained from call stacks associated with the threads of interest. Call stack information may be obtained from a virtual machine, such as a Java™ virtual machine. Java™ is a trademark of Sun Microsystems, Inc. There are many approaches for selectively instrumenting code for obtaining trace data. One approach is to replace the code using byte code instrumentation. Other approaches include dynamically patching code. The advantage of selectively instrumenting code is to minimize the overhead associated with executing the instrumentation code. Many approaches are presently used for obtaining call stack information. These approaches include using entry/exit events, an application timer tick, or instrumenting codes that sample the instrumented values.

BRIEF SUMMARY OF THE INVENTION

The illustrative embodiments provide a computer implemented method, apparatus, and computer usable program code for sampling call stack information. A set of methods and a set of criteria are received. Responsive to detecting an event associated with a method in the set of methods, a determination is made as to whether the method has met a set of criteria comprising at least one of a time based metric and a hardware performance monitor counter metric. A call stack is retrieved for the method if the method has met the set of criteria. The retrieved call stack is saved in a tree.

DETAILED DESCRIPTION OF THE INVENTION

Figure 1:
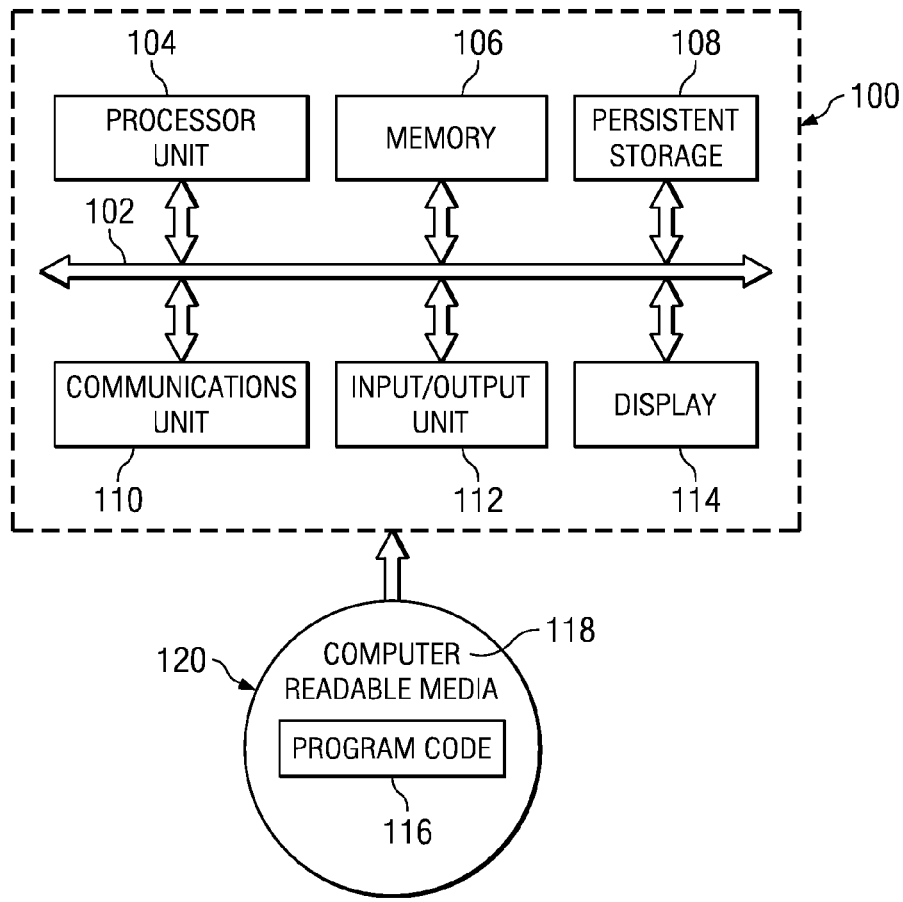
FIG. 1 is a diagram of a data processing systems in which illustrative embodiments may be implemented.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the present invention may take the form of a computer program product embodied in any tangible medium of expression having computer usable program code embodied in the medium.

Any combination of one or more computer usable or computer readable medium(s) may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device.

Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer usable or computer readable medium may be any medium that can contain, store, communicate, propagate, or transport the program for use by or in connection with the instruction execution system, apparatus, or device. The computer usable medium may include a propagated data signal with the computer usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer or other programmable data processing apparatus to function in a particular manner, such that the instructions stored in the computer readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Turning now to FIG. 1, a diagram of a data processing system is depicted in accordance with an illustrative embodiment. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices. A storage device is any piece of hardware that is capable of storing information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard and mouse. Further, input/output unit 112 may send output to a printer. Display 114 provides a mechanism to display information to a user.

Instructions for the operating system and applications or programs are located on persistent storage 108. These instructions may be loaded into memory 106 for execution by processor unit 104. The processes of the different embodiments may be performed by processor unit 104 using computer implemented instructions, which may be located in a memory, such as memory 106. These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 116 is located in a functional form on computer readable media 118 that is selectively removable and may be loaded onto or transferred to data processing system 100 for execution by processor unit 104. Program code 116 and computer readable media 118 form computer program product 120 in these examples. In one example, computer readable media 118 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 118 also may take the form of a persistent storage, such as a hard drive, a thumb drive, or a flash memory that is connected to data processing system 100. The tangible form of computer readable media 118 is also referred to as computer recordable storage media. In some instances, computer readable media 118 may not be removable.

Alternatively, program code 116 may be transferred to data processing system 100 from computer readable media 118 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code. In these different illustrative examples, program code 116 may include code for processes to perform call stack sampling based on criteria.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown.

As one example, a storage device in data processing system 100 is any hardware apparatus that may store data. Memory 106, persistent storage 108 and computer readable media 118 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

The different illustrative embodiments recognize that although existing techniques allow for selective instrumentation to profile code, these techniques focus on a set of instrumented threads or methods. The different advantageous embodiments also recognize that techniques are present for unwinding a call stack for these instrumented methods. A call stack is a data structure used to track information regarding processes, threads, subroutines, and other suitable pieces of code that are executing. A call stack may be used to track a point at which each active piece of code should return when that piece of code finishes execution. This unwinding is also referred to as obtaining call stack information.

The illustrative embodiments recognize that a need is present to selectively obtain this call stack information when an event occurs. Thus, the different illustrative embodiments provide a computer implemented method, apparatus, and computer usable program code for sampling call stack information. Execution of a set of methods for an event relating to a selected method in the set of methods is monitored. In response to detecting the event, a determination is made as to whether the execution environment associated with the event needs a set of criteria. A set used herein refers to one or more items. For example, a set of criteria is one or more criteria. In response to the execution environment meeting the set of criteria, the call stack information is obtained. This call stack information may be, for example, without limitation, a partial call stack or a full stack.

Figure 2:
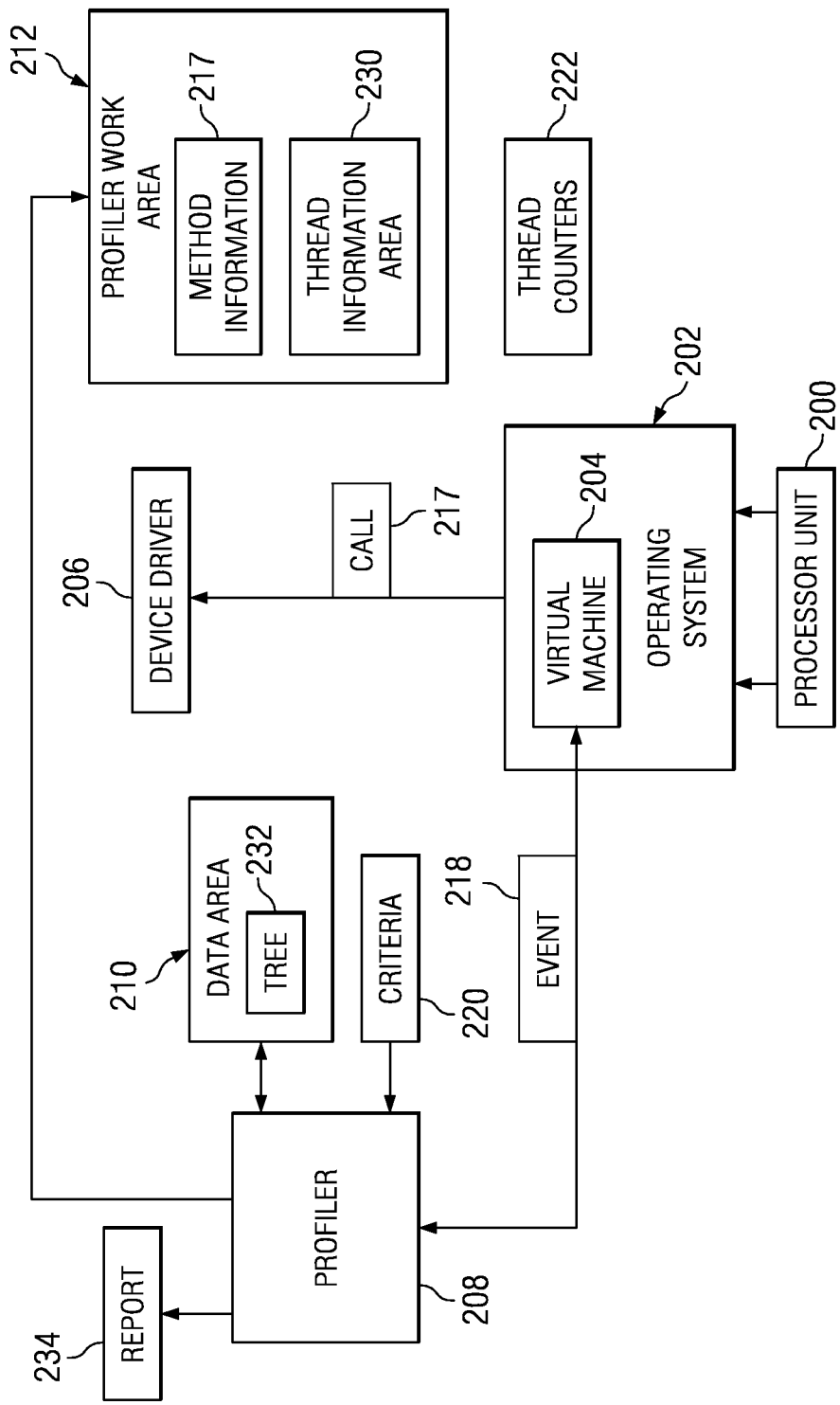
FIG. 2 is a diagram illustrating components used to obtain call stack information in accordance with an illustrative embodiment.

With reference now to FIG. 2, a diagram illustrating components used to obtain call stack information is depicted in accordance with an illustrative embodiment. In this depicted example, the components are examples of hardware and software components found in a data processing system, such as data processing system 100 in FIG. 1. These components include processor unit 200, operating system 202, virtual machine 204, device driver 206, profiler 208, data area 210, and profiler work area 212. In different illustrative examples, an execution context may execute in operating system 202. Each processor may be running a separate execution context or thread. Virtual machine 204 may execute methods, which may be a subroutine or function called by virtual machine 204 during execution. In response to an event, such as entry and/or exit of a method, virtual machine 204 may send event 218 to profiler 208. A set of methods in the methods may be instrumented based on user input to generate event 218. For example, the set of methods may be modified to include code to generate event 218 when certain conditions occur. These conditions may be, for example, every time an entry or exit occurs from the method, after a selected period of time has passed while executing the method, or some other suitable condition.

In these examples, event 218 may be, for example, entry and/or an exit into or from a method detected by virtual machine 204. Other events, such as, object allocation, or CONTENDED_MONITOR_ENTER as defined in the Java® Virtual Machine profiler interface (JVMPI) or Java® Virtual Machine tool interface (JVMTI) specifications may be monitored. In these examples, virtual machine 204 may take the form of a Java™ virtual machine. Of course, other virtual machines may be used depending on a particular implementation. These types interfaces are examples of interfaces that may be used to access a virtual machine and are referred to generally as virtual machine interfaces.

Profiler 208 may selectively obtain call stack information in response to receiving event 218 using criteria 220. In the illustrative examples, criteria 220 may be received through user input. The user input may be received in various forms. For example, the user may enter criteria 220 through a user interface for profiler 208 and/or place criteria 220 in a file and send that file to profiler 208. Criteria 220 is compared with the execution environment associated with the event. The execution environment may be anything in a data processing system that is associated with the event. The execution environment may be, for example, instructions executed, elapsed time since a last entry into a method, the bytes allocated by the method, the number of cache misses, and other metrics that may be determined Criteria 220 is a set of criteria and may take various forms. Criteria 220 may specify various criteria for whether to obtain call stack information. These criteria may include time based metrics. For example, the elapsed time between the entry and exit or the amount of time that has occurred since the last entry and exit occurred is an example of one time based metric. Other time based metrics, could include the latency time, which is the elapsed time minus the time on thread.

Other metrics could include a hardware performance monitor counter metric. This type of metric is a counter based metric that counts or tracks a number of occurrences of one or more selected events. A hardware performance monitor counter metric may include, for example, without limitation, the number of instructions completed, the number of cache misses, the number of translation lookaside buffer (TLB) misses, the number of branch misses. Additional metrics could include the number of bytes allocated by the current method or any method that it calls.

These types of metrics may be determined by monitoring object allocation events and or instrumenting new allocations. A determination could be made that the method being monitored has been entered and the allocation has occurred on the thread before the method has been exited. For example, criteria 220 may specify that call stack information is to be obtained for a selected type or class of methods. In another example, criteria 220 may specify that call stack information is to be obtained if the method starts with a common prefix such as "java/lang" and the elapsed time between the entry and exit of a method exceeds ten milliseconds. In this example the starting of the method with java/lang may be considered a common characteristic that may be found in other methods. In yet another example, the call stack information may be obtained if the selected method exceeds a set number of instructions of execution such as, for example, 500,000 instructions. In another embodiment, object allocations may be monitored and the bytes allocated for objects may be checked against a threshold as the criteria to be used to retrieve a call stack. In this case, the object allocated at the time the threshold criteria is met, may be identified as the leaf node and its base metric may be incremented to reflect the allocation information.

Criteria 220 also may specify what call stack information is to be obtained. In some examples, the entire call stack is to be obtained, while in other examples, only a portion of the call stack is obtained.

In these examples, thread counters 222 may store various metrics about the execution environments by thread context. These metrics include, for example, without limitation, the number of instructions executed, the time elapsed since last execution, the number of events, such as method enter events, or some other suitable metric. In a typical embodiment, call out to profiler 208 is made when an event occurs. At the entry to profiler 208, the metrics are captured and the difference between the values saved when profiler 208 last exited is used to represent the change of values that occurred since the last event. The metrics may be accumulated by device driver 206 in an area that can be accessed by the profiler, such as, for example, profiler work area 212. Alternatively, there may be a call from profiler 208, which retrieves the metrics from device driver 206 or operating system 202 that has virtualized some metrics by thread. Profiler 208 then saves the information gathered in its thread work area.

These values may also be modified to reflect the instrumentation overhead. This area may be, for example, data area 210. These values are typically applied as base values to the metrics being recorded for the method that was last identified as being executed. Just before profiler 208 finishes the processing for the event, profiler 208 typically reads the metrics again and saves them in a thread information area 230 to be used with the next event. In other embodiments, global metrics may be used, but in those cases semaphores or locks should be used to update the values.

For example, when a method is entered and profiler 208 is notified, the metrics read as profiler 208 is exiting may be stored in the thread information area 230. When the method exits, profiler 208 may then be notified and the new value of the metrics may be retrieved. The difference between the values last stored and the current values represent the changes of the metrics between the entry of the method and the exit of the method. The difference between these values may be used to determine the number of instructions executed by the method. This information may be used to calculate the instructions executed by the method as well as all routines called by the method. Identifying values of metrics virtualized by thread may be formed using various known mechanisms.

As one example, U.S. Pat. No. 6,658,654 identifies one manner in which values for metrics may be virtualized by thread. The mechanism in this example may be used to maintain metrics on a per thread basis. Further, the metrics may be read by a profiler processing event such as a method entry and a method exit event. This particular mechanism allows for values of performance counters to be read at entries and exits to methods for use in calculating differences between the metrics. By reading and saving the information in the profiler's per thread work area at events processing time the profiler may determine if some criteria is met.

If profiler 208 determines that call stack information should be obtained in response receiving event 218, call stack information may be obtained by profiler 208. The call stack information may be placed into tree 232 for later processing. In these examples, tree 232 contains call stack information and other information suitable for analyzing execution of an application. This information may include, for example, accumulated latency times, instructions completed, cache misses, and other suitable information. Further, tree 232 also may include information about a leaf node, which was the last routine being executed on the thread at the time the call stack was retrieved. The metrics are typically recorded and accumulated in the leaf node as a base metric. Many base metrics may be accumulated and recorded. When a sample of a call stack is taken at least one counter in the leaf node of the tree is incremented to indicate that a sample has been taken in these examples. Profiler 208 may also generate report 234, which may be a representation of the information stored in tree 232.

In this manner, the different illustrative embodiments provide a capability to determine whether the entry or exit into a particular method should result in the collection of call stack information. This determination is made by profiler 208 using criteria 220 as described above. As a result, an additional capability to selectively obtain call stack information is provided in addition to being able to select particular sets of threads for profiling.

Figure 3:
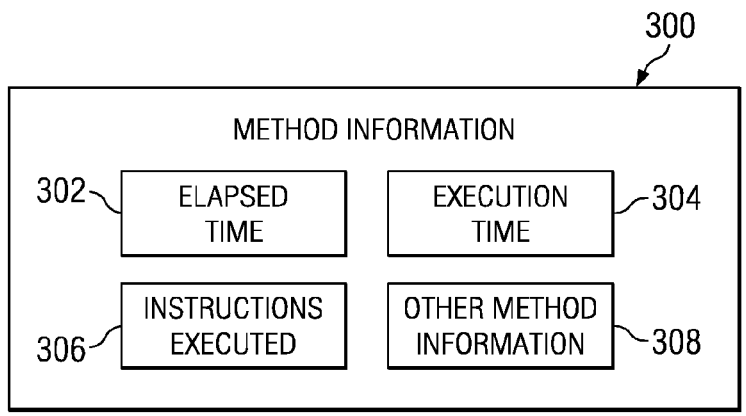
FIG. 3 is a diagram illustrating method information that may be stored in a device driver work area in accordance with an illustrative embodiment.

With reference now to FIG. 3, a diagram illustrating method information that may be stored in a profiler work area is depicted in accordance with an illustrated embodiment. In this example, method information 300 is an example of method information 217 stored in profiler work area 212. In this example, method information 300 includes elapsed time 302, execution time 304, instructions executed 306, and other method information 308.

Elapsed time 302 may identify the amount of time that has elapsed since the last entry and exit into a method. Execution time 304 may identify the amount of time used to execute the method. This information may be identified based on the time a method is entered and the time the method is exited. Instructions executed 306 may include the number of instructions executed by the method and/or the number of instructions executed since the last entry and exit for a method. Other method information 308 may include information from counters associated on a per thread basis to track particular threads. An example is thread counters 222 in FIG. 2. In these examples, some of method information 300 may be derived from values obtained from thread counters 222 stored in thread information area 230 in FIG. 2.

Figure 4:
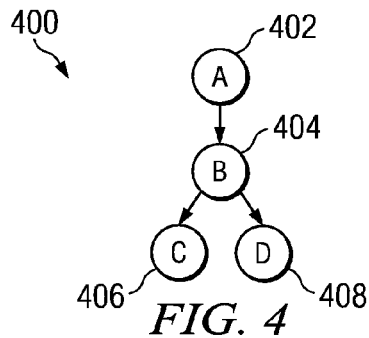
FIG. 4 is a diagram of a tree in accordance with an illustrative embodiment.

Turning to FIG. 4, a diagram of a tree is depicted in accordance with an illustrative embodiment. Tree 400 is a call tree and is an example of tree 232 in FIG. 2. Tree 400 is accessed and modified by an application, such as profiler 208 in FIG. 2. In this depicted example, tree 400 contains nodes 402, 404, 406, and 408. Node 402 represents an entry into method A, node 404 represents an entry into method B, and nodes 406 and 408 represent entries into method C and D, respectively. Each of these nodes may include call stack information as well as latency information associated with a particular thread for a method. This latency information includes, for example, elapsed time, execution time, accumulated latency, and difference in latency since the last sampling.

Figure 5:
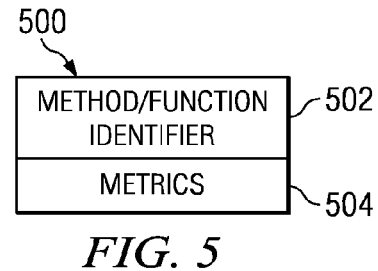
FIG. 5 is a diagram illustrating information in a node in accordance with an illustrative embodiment.

With reference next to FIG. 5, a diagram illustrating information in a node is depicted in accordance with an illustrative embodiment. Entry 500 is an example of information in a node, such as node 402 in FIG. 4. In this example, entry 500 contains method/function identifier 502 and metrics 504. Method/function identifier 502 may be used to identify the particular method for which metrics 504 present. Metrics 504 may include various information of interest. Metrics 504 may include, for example, without limitation, elapsed time since last execution of a method, number of instructions executed by the method, time to execute the method, cache misses, and other suitable metrics.

Figure 6:
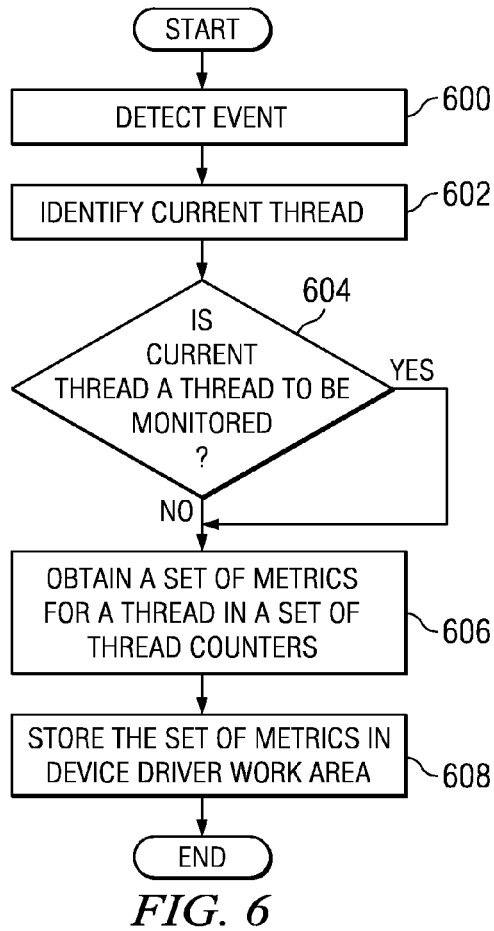
FIG. 6 is a process that may be implemented in a device driver in accordance with an illustrative embodiment.

With reference now to FIG. 6, a flowchart of a process for processing event depicted in accordance with an illustrative embodiment. In this example, the process illustrated in FIG. 6 may be implemented in a, profiler such as profiler 208 in FIG. 2.

The process begins by detecting an event (step 600). This event may be detected in response to a call sent to the profiler from a virtual machine indicating that an event has occurred. In these examples, the event may be an entry or exit for a method or a contended monitor event or an object allocation event. In response to detecting event, the current thread being executed is identified (step 602). Next, a determination is made as to whether the current thread is a thread being monitored (step 604). The identification of whether a current thread is a thread being monitored may be performed in a number of different ways. This identification may be made using a policy or a set of rules. For example, the target thread may be a set of threads registered for monitoring by information passed to the profiler. The thread or set of threads may have been selected by a user by specifying the thread names. In other examples, whether the current thread is being monitored may be based on a set of criteria, such as criteria 220 in FIG. 2.

If the current thread is a thread that is to be monitored, the process then obtains a set of metrics for the thread on which the event occurred (step 606). The set of thread counters may be a set of virtualized hardware performance monitoring counters in which various metrics are stored for a particular thread. These metrics may include, for example, instructions completed, TLB misses, branch misses, cache misses, cycles, and other metrics available from the hardware performance monitoring counter support.

The process then stores the set of metrics in the profiler thread specific work area (step 608) with the process terminating thereafter. The information from the thread counter may be stored in thread work area 222 in FIG. 2. This information metric may then be used to determine whether call stack information should be collected for a current thread. These metrics may be used to determine whether to collect call stack information and/or provide information relating to a thread of interest. With reference again to step 604, if the thread is not a thread to be monitored, the process terminates.

The metrics gathered in the process in FIG. 6 may be used to generate other metrics for use on comparing to criteria used to determine whether to sample call stack information. For example, a first set of metrics may be obtained after processing a first event including one of a method entry or a method exit event. The storing the first set of the metrics are stored as described above in step 608. A second set of the metrics may be obtained using the process described above in step 606. Step 606 also may include performing some calculations or analysis. In this example the difference between the first set of the metrics and the second set of the metric may be taken to form a result. If the metric being measure is a time at which the events occurred, this result is a period of time that may be stored as a time based metric in step 608.

Figure 7:
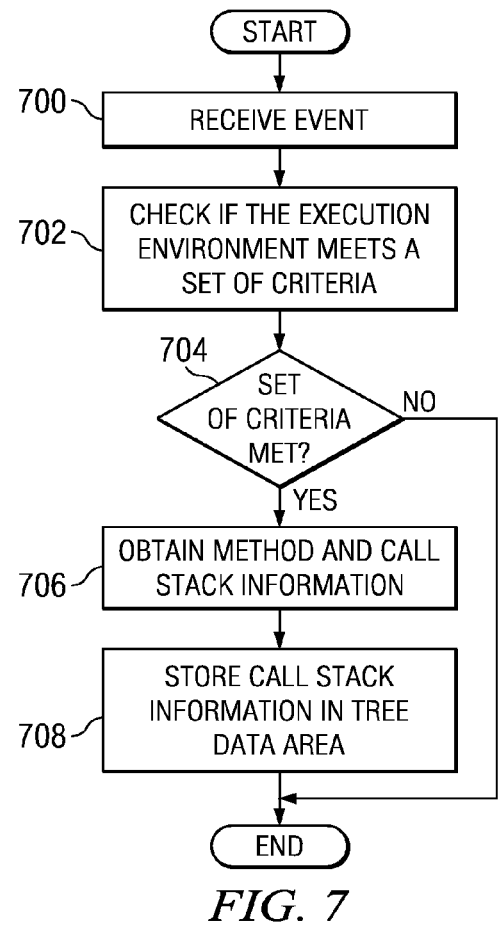
FIG. 7 is a flowchart of a process for comparing method information to criteria in accordance with an illustrative embodiment.

With reference now to FIG. 7, a flowchart of a process for comparing method information to criteria is depicted in accordance with an illustrative embodiment. The process illustrated in FIG. 7 may be implemented in a software component such as, for example, profiler 208 in FIG. 2. This process may be used by profiler to determine whether method information needs a set of criteria such that call stack information should be collected.

The process begins by receiving an event (step 700). In these examples, the event may be received from a virtual machine. In response to receiving the event, a check is made to see whether the execution environment associated with the event meets a set of criteria (step 702). This check may be performed using method information 216 and criteria 220 in FIG. 2. The method information may include, for example, instruction execution, time between entry and exits, and/or other monitored information. The criteria in these examples may be a time based metric or some other metric that is monitored in the data processing system. The time based metric, may be for example a set amount of time to elapse since last execution of a method or some amount of time for the execution of the method. The set of criteria also may require a certain number of instructions to have been executed, some threshold number of events, some number of bytes allocated by the method, or any other monitored criteria.

The process then determines whether the set of criteria has been met from the check performed in step 702 (step 704). If the set of criteria is met, the process obtains method information (step 706). In collecting method and call stack information, the process may obtain information for the entire call stack or just a portion of the call stack, depending upon a particular implementation. The method information may be, for example, method information 216 in profiler work area 212 in FIG. 2. The call stack information is saved in the tree data area (step 708) with the process terminating thereafter. If the set of criteria is not met, the process terminates without collecting any information. The data area consists of a tree which may be used for further analysis. Thus, the different illustrative embodiments provide a computer implemented method, apparatus, and computer of a program code for sampling call stack information. The execution of the set of methods is monitored for an event relating to a selected method in a set of methods. In response to detecting the event, a determination is made as to whether an execution environment associated with the event meets a set of criteria. If the execution environment meets the set of criteria, then call stack information is obtained.

Thus, an additional capability to selectively obtain call stack information based on events is present in one or more of the different illustrative embodiments. This capability is in addition to a capability to select particular threads for call stack sampling. As a result, a greater granularity is present for obtaining call stack information than is currently available. In these examples, the call stack information may be gathered using operating system support or Java™ virtual machine tools interface (JVMTI).

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Also, As used herein the phrase "at least one of" when used with a list of items means that different combinations one or more of the items may be used and only one of each item in the list may be needed. For example, "at least one of item A, item B, and item C" may include, for example, without limitation, item A or item A and item B. This example also may include item A, item B, and item C or item B and item C. In other examples, "at least one of item A, item B, and item C" may be two if item A and one of item B or three of item B and 2 of item C, or some other suitable combination.

The corresponding structures, materials, acts, and equivalents of all means or step plus function elements in the claims below are intended to include any structure, material, or act for performing the function in combination with other claimed elements as specifically claimed.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

Furthermore, the invention can take the form of a computer program product accessible from a computer usable or computer readable medium providing program code for use by or in connection with a computer or any instruction execution system. For the purposes of this description, a computer usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device), or a propagation medium. Examples of a computer readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method of sampling call stack information, the computer implemented method comprising:
   receiving a set of methods and a set of criteria received from a user prior to starting a data processing operation to use to obtain call stack information;
   responsive to detecting an event associated with a particular method in the set of methods, determining whether the particular method has met a set of criteria comprising at least one of a time based metric and a hardware performance monitor counter metric:
   responsive to determining the particular method has met the set of criteria, determining whether an entry or exit into the particular method should result in a collection of call stack information;
   responsive to determining the particular method has met the set of criteria retrieving a call stack portion for the particular method; and
   saving the retrieved call stack portion in a tree.

2. The computer implemented method of claim 1, wherein the time based metric comprises at least one of an elapsed time between an entry and an exit for the particular method exceeding a threshold value and a period of time since the particular method was last executed.

3. The computer implemented method of claim 1, wherein the hardware performance monitor counter metric comprises at least one of a number of instructions executed on a thread exceeding a specified threshold value, a selected latency time, a number of instructions completed, a number of cache misses, a number of translation lookaside buffer misses, and a number of branch misses.

4. The computer implemented method of claim 1, wherein the set of criteria further comprises a number of bytes allocated by a current method and a number of bytes allocated by a method called by a current method.

5. The computer implemented method of claim 1, wherein at least one counter in a leaf node of the tree is incremented.

6. The computer implemented method of claim 1, wherein an execution environment has metrics that have been virtualized by a thread and wherein the determining step comprises:
   obtaining a first set of metrics after processing a first event including one of a particular method entry and a particular method exit event;
   storing the first set of the metrics obtained after processing the first event;

obtaining a second set of the metrics when a second event occurs including one of a particular method entry and a particular method exit event;

calculating a difference between the first set of the metrics and the second set of the metric to form a result; and comparing the result to the set of criteria to determine if the particular method has met the set of criteria.

7. The computer implemented method of claim 1, wherein the set of methods meets a naming criteria.

8. The computer implemented method of claim 7, wherein the naming criteria is a common prefix.

9. The computer implemented method of claim 1, further comprising:

instrumenting the set of methods to generate the event.

10. The computer implemented method of claim 1, wherein the retrieving step comprises:

retrieving a call stack for the particular method using a virtual machine interface if the method has met the set of criteria.

11. A computer comprising:

a bus;

a memory connected to the bus, wherein program code is stored on the memory; and a processor unit connected to the bus, wherein the processor unit executes the program code to receive a set of methods and a set of criteria received from a user prior to starting a data processing operation to use to obtain call stack information; determine whether a particular method has met a set of criteria comprising at least one of a time based metric and a hardware performance monitor counter metric in response to detecting an event associated with the particular method in the set of methods and, if the particular method has met the set of criteria, determine whether an entry or exit into the particular method should result in a collection of call stack information; and retrieve a call stack for the particular method if the particular method has met the set of criteria; and save the retrieved call stack in a tree.

12. The computer of claim 11, wherein the time based metric comprises at least one of an elapsed time between an entry and an exit for the particular method exceeding a threshold value and a period of time since the particular method was last executed.

13. The computer of claim 11, wherein the hardware performance monitor counter metric comprises at least one of a number instructions executed on thread exceeding a specified threshold value, a selected latency time, a number of instructions completed, a number of cache misses, a number of translation lookaside buffer misses, and a number of branch misses.

14. The computer of claim 11, wherein the set of criteria further comprising a number of bytes allocated by a current method and a number of bytes allocated by a method called by a current method.

15. The computer of claim 11, wherein an execution environment has metrics that have been virtualized by a thread and wherein in executing the program code to determine whether the method has met a set of criteria comprising at least one of a time based metric and a hardware performance monitor counter metric step, the processor unit further executes the program code to obtain a first set of metrics after processing a first event including one of a particular method entry and a particular method exit event; store the first set of the metrics obtained after processing the first event; obtain a second set of the metrics when a second event occurs including one of a method entry and a method exit event; take a difference between the first set of the metrics and the second set of the metric to form a result; and compare the result to the set of criteria to determine if the particular method has met the set of criteria.

16. A computer program product for sampling call stack information, the computer program product comprising:

a computer recordable storage device;

program code, stored on the computer recordable storage device, for receiving a set of methods and a set of criteria from a user prior to starting a data processing operation to use to obtain call stack information;

program code, stored on the computer recordable storage device, responsive to detecting an event associated with a particular method in the set of methods, for determining whether the particular method has met a set of criteria comprising at least one of a time based metric and a hardware performance monitor counter metric and, if the particular method has met the set of criteria, determine whether an entry or exit into the particular method should result in a collection of call stack information;

program code, stored on the computer recordable storage device, for retrieving a call stack for the particular method if the particular method has met the set of criteria; and program code, stored on the computer recordable storage device, for saving the retrieved call stack in a tree.

17. The computer program product of claim 16, wherein the time based metric comprises at least one of an elapsed time between an entry and an exit for the particular method exceeding a threshold value and a period of time since the particular method was last executed.

18. The computer program product of claim 16, wherein the hardware performance monitor counter metric comprises at least one of a number instructions executed on a thread exceeding a specified threshold value, a selected latency time, a number of instructions completed, a number of cache misses, a number of translation lookaside buffer misses, and a number of branch misses.

19. The computer program product of claim 16, wherein an execution environment has metrics that have been virtualized by thread and wherein program code for determining whether the particular method has met a set of criteria comprising at least one of a time based metric and a hardware performance monitor counter metric comprises:

program code, stored on the computer recordable storage device, for obtaining a first set of metrics after processing a first event including one of a particular method entry and a particular method exit event;

program code, stored on the computer recordable storage device, for storing the first set of the metrics obtained after processing the first event;

program code, stored on the computer recordable storage device, for obtaining a second set of the metrics when a second event occurs including one of a particular method entry and a particular method exit event;

program code, stored on the computer recordable storage device, for taking a difference between the first set of the metrics and the second set of the metric to form a result; and program code, stored on the computer recordable storage medium device, for comparing the result to the set of criteria to determine if the particular method has met the set of criteria.

20. The computer program product of claim 16 further comprising:

program code for instrumenting the set of methods to generate the event.

* * * * *